（12）United States Patent
Ikeda et al.

(10) Patent No.: US 7,324,497 B2
(45) Date of Patent: Jan. 29, 2008

(54) MOBILE COMMUNICATION SYSTEM USING A DOWNLINK SHARED CHANNEL

(75) Inventors: Eiji Ikeda, Kawasaki (JP); Tomonori Kumagai, Kawasaki (JP); Tetsuo Tomita, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 10/999,206

(22) Filed: Nov. 24, 2004

(65) Prior Publication Data

US 2005/0122950 A1 Jun. 9, 2005

Related U.S. Application Data

(63) Continuation of application No. PCT/JP02/05340, filed on May 31, 2002.

(51) Int. Cl.
*H04J 3/00* (2006.01)
(52) U.S. Cl. .................. 370/345; 370/343; 370/347; 370/348
(58) Field of Classification Search ............... 455/428, 455/434, 438, 439, 444, 445; 370/344, 345, 370/347, 349
See application file for complete search history.

(56) References Cited

U.S. PATENT DOCUMENTS 6,512,779 B1 1/2003 Vollmer et al.
2001/0036810 A1 11/2001 Larsen
2002/0001296 A1 1/2002 Lee et al.
2002/0191567 A1* 12/2002 Famolari et al. ............ 370/335
2004/0081192 A1* 4/2004 Koulakiotis et al. ........ 370/432
2006/0140158 A1* 6/2006 Terry .......................... 370/335

FOREIGN PATENT DOCUMENTS

| EP | 1 069 790 | 1/2001 |
|---|---|---|
| JP | 2000-151622 | 5/2000 |
| JP | 2000-252940 | 9/2000 |
| JP | 2001-060932 | 3/2001 |
| JP | 2001-292093 | 10/2001 |
| JP | 2002-009743 | 1/2002 |

OTHER PUBLICATIONS

International Search Report dated Sep. 10, 2002.

* cited by examiner

*Primary Examiner*—Duc M. Nguyen
*Assistant Examiner*—Dai Phuong
(74) *Attorney, Agent, or Firm*—Bingham McCutchen LLP

(57) ABSTRACT

A mobile communication system includes a radio network control apparatus having inside a function block for processing a downlink shared channel and table means for storing various setting information related to the downlink shared channel communication and the downlink shared channel multi-cast communication. According to the information, a multi-cast communication (including uni-cast communication) is realized by using the downlink shared channel for one or more mobile apparatuses. Moreover, a base station has a function to transmit the downlink shared channel data and signaling data received from a radio network control apparatus, to a mobile apparatus via a radio line. Furthermore, it is possible to multi-cast data selectively to a particular mobile apparatus being call-connected.

13 Claims, 13 Drawing Sheets

FIG.3A
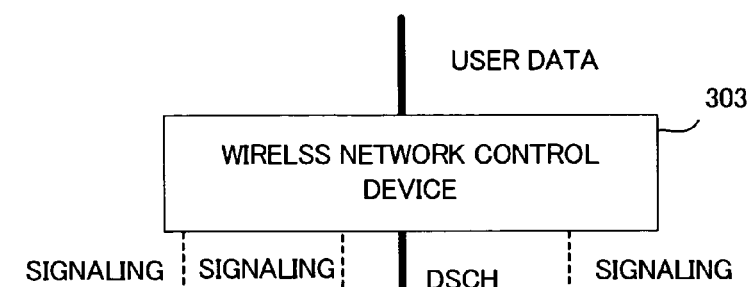
FIG.3B
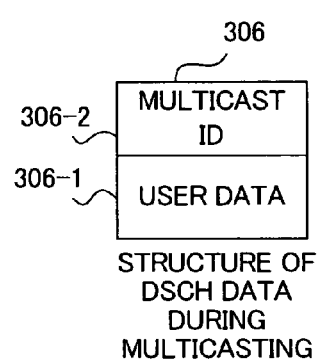
STRUCTURE OF DSCH DATA DURING MULTICASTING
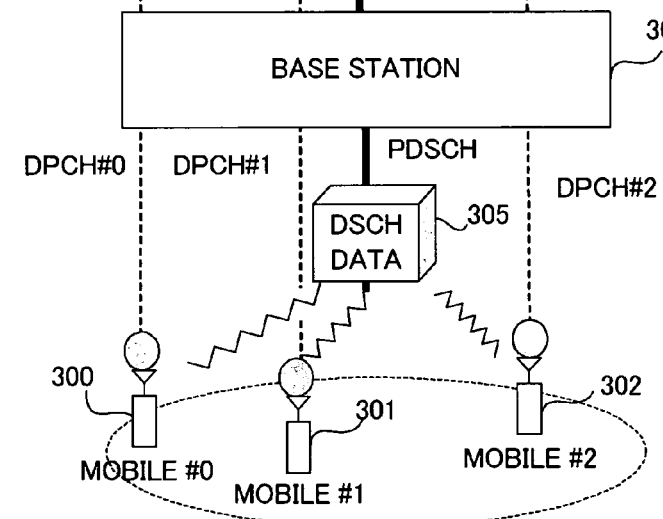
● SIGNALING DATA

FIG. 5

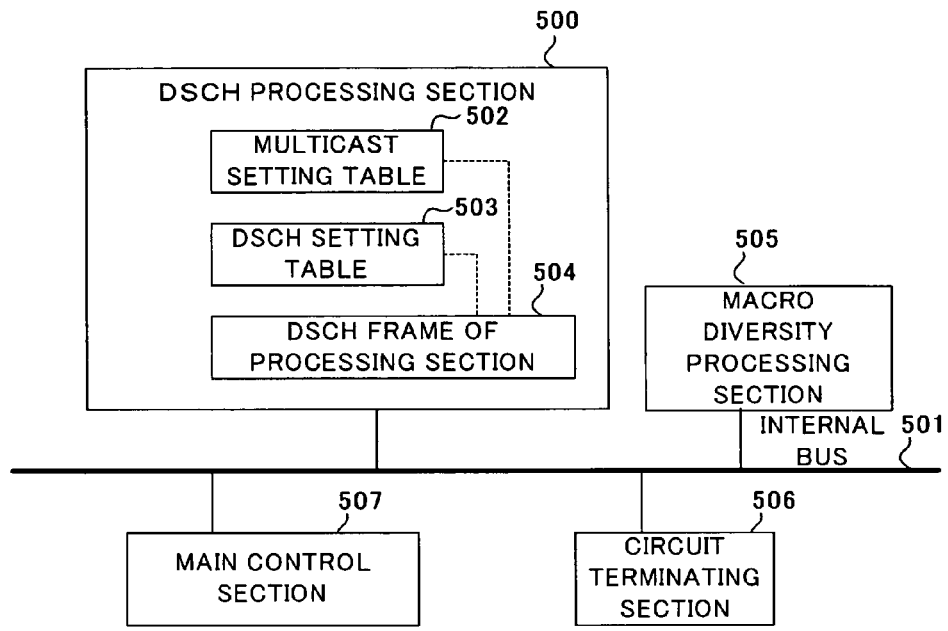

FIG. 6

| a | b | c | d0 | d1 | d2 | |
|---|---|---|----|----|----|---|
| MULTICAST CHANNEL ID#A | D S C H ID#A | NUMBER OF MOBILES #A | MOBILE ID#A0 | MOBILE ID#A1 | MOBILE ID#A2 | ··· |
| MULTICAST CHANNEL ID#B | D S C H ID#B | NUMBER OF MOBILES #B | MOBILE ID#B0 | MOBILE ID#B1 | MOBILE ID#B2 | ··· |
| MULTICAST CHANNEL ID#C | D S C H ID#C | NUMBER OF MOBILES #C | MOBILE ID#C0 | MOBILE ID#C1 | MOBILE ID#C2 | ··· |
| MULTICAST CHANNEL ID#D | D S C H ID#D | NUMBER OF MOBILES #D | MOBILE ID#D0 | MOBILE ID#D1 | MOBILE ID#D2 | ··· |
| ⋮ | ⋮ | | ⋮ | ⋮ | ⋮ | ⋮ |

FIG. 7

| (a) | (b) | (c) | (d) |
|---|---|---|---|
| DEDICATED CHANNEL ID#0 | D S C H ID#0 | MOBILE ID#0 | TIMING OFFSET #0 |
| DEDICATED CHANNEL ID#1 | D S C H ID#1 | MOBILE ID#1 | TIMING OFFSET #1 |
| DEDICATED CHANNEL ID#2 | D S C H ID#2 | MOBILE ID#2 | TIMING OFFSET #2 |
| DEDICATED CHANNEL ID#3 | D S C H ID#3 | MOBILE ID#3 | TIMING OFFSET #3 |
| ⋮ | ⋮ | ⋮ | ⋮ |

FIG. 8

[MULTICAST SETTING TABLE]

| (a) | (b) | (c) | (d) | | | | |
|---|---|---|---|---|---|---|---|
| MULTICAST CHANNEL ID#0 | D S C H ID#0 | 2 | MOBILE ID#0 | MOBILE ID#2 | Null | Null | ... |
| MULTICAST CHANNEL ID#1 | D S C H ID#0 | 2 | MOBILE ID#0 | MOBILE ID#2 | Null | Null | ... |
| MULTICAST CHANNEL ID#2 | D S C H ID#1 | 3 | MOBILE ID#3 | MOBILE ID#4 | MOBILE ID#5 | Null | ... |

FIG. 9

〖DSCH SETTING TABLE〗

| (a) | (b) | (c) | |
|---|---|---|---|
| DEDICATED CH ID#0 | D S C H ID#0 | MOBILE ID#0 | TIMING OFFSET #0 |
| DEDICATED CH ID#1 | D S C H ID#0 | MOBILE ID#1 | TIMING OFFSET #1 |
| DEDICATED CH ID#2 | D S C H ID#0 | MOBILE ID#2 | TIMING OFFSET #2 |
| DEDICATED CH ID#3 | D S C H ID#1 | MOBILE ID#3 | TIMING OFFSET #3 |
| DEDICATED CH ID#4 | D S C H ID#1 | MOBILE ID#4 | TIMING OFFSET #4 |
| DEDICATED CH ID#5 | D S C H ID#1 | MOBILE ID#5 | TIMING OFFSET #5 |
| DEDICATED CH ID#6 | D S C H ID#1 | MOBILE ID#6 | TIMING OFFSET #6 |
| DEDICATED CH ID#7 | D S C H ID#2 | MOBILE ID#7 | TIMING OFFSET #7 |
| DEDICATED CH ID#8 | D S C H ID#2 | MOBILE ID#8 | TIMING OFFSET #8 |

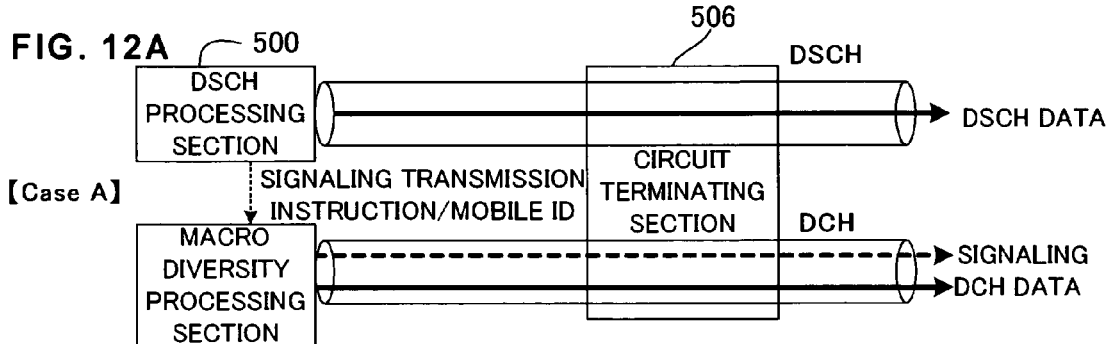
FIG. 12A [Case A]
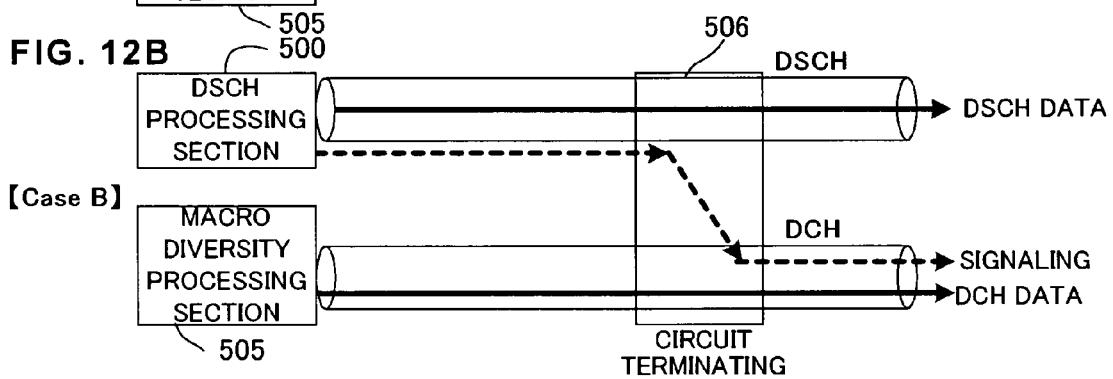
FIG. 12B [Case B]
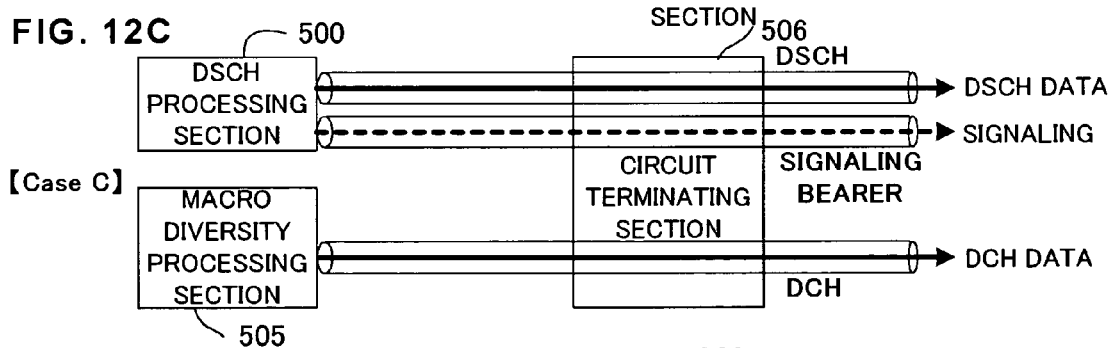
FIG. 12C [Case C]
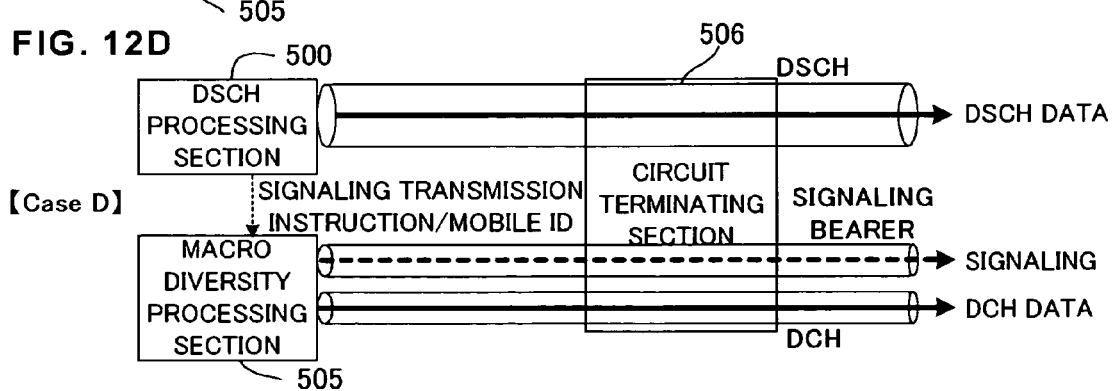
FIG. 12D [Case D]

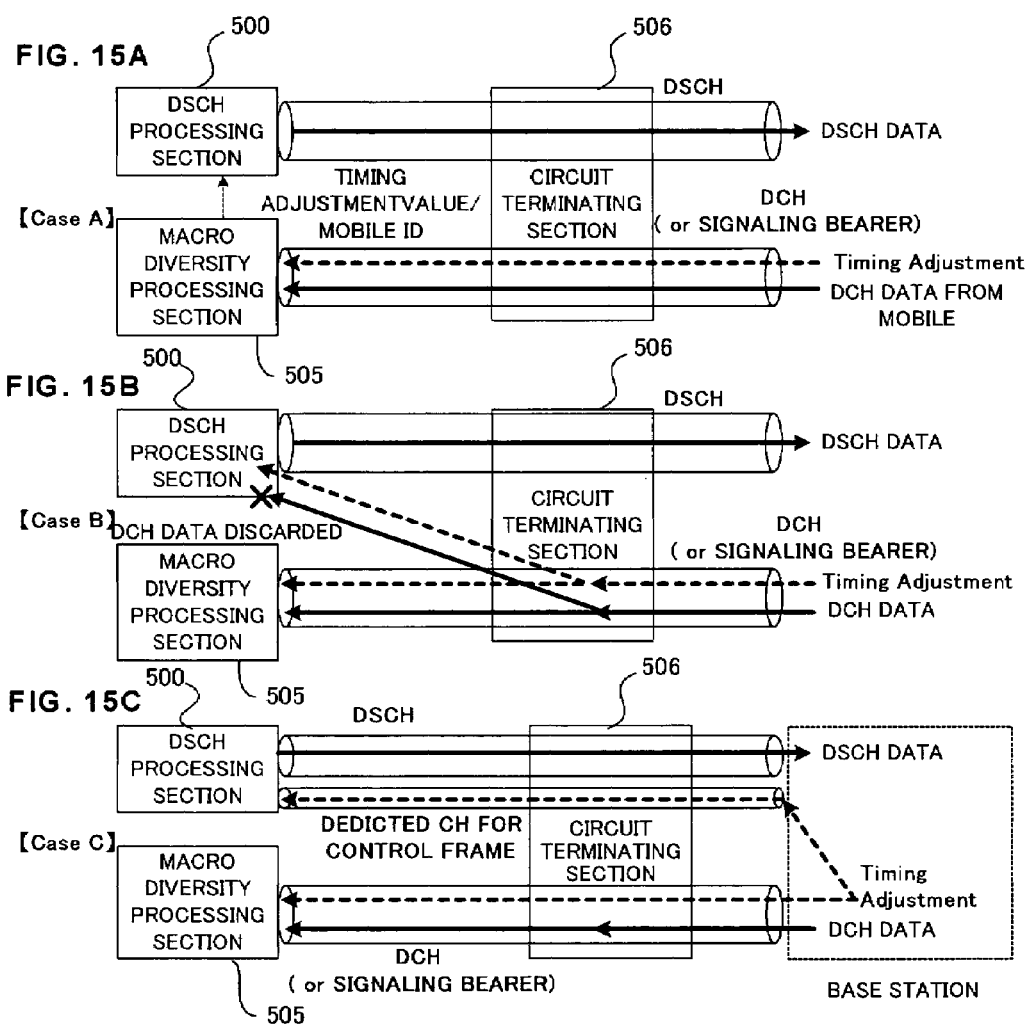

MOBILE COMMUNICATION SYSTEM USING A DOWNLINK SHARED CHANNEL

CROSS-REFERENCE TO RELATED APPLICATION

The present application is a continuation of International Application No. PCT/JP02/05340 which was filed on May 31, 2002, which is herein incorporated by reference.

TECHNICAL FIELD

The present invention relates to a communication method and device in a mobile communication system using a downlink shared channel (DSCH).

BACKGROUND ART

In recent years, development of CDMA (Code Division Multiple Access) communication systems has proceeded apace, and the need to shift to Wideband-CDMA (W-CDMA) systems that provide a wider bandwidth than previously in order to exchange not merely voice but also large-capacity data such as images or video at high speed, and with high quality and efficiency has increased.

Communication systems adapted to these demands are generally called third generation mobile communication systems and the standards relating thereto are co-coordinated by the 3GPP (Third Generation Partnership Project), which is the world standardization organization; introduction of such systems has already begun.

In 3GPP, a DSCH (downlink shared channel) is defined as a downlink channel that is used in shared fashion by a plurality of mobiles (see 3GPP TS 25.427, TS 25.435). With DSCH, a single channel can be shared by a large number of mobiles and flexible power control can be achieved. In this way, high-speed and high-efficiency data communication can be implemented with limited wireless resources so the importance of this technique is expected to increase in the future.

FIG. 1A to 1C show an outline of downlink data communication (communication to mobiles) in a communication system employing DSCH. This system comprises a core network 100, which is a wired network, a wireless network control device 101, base stations 102 and mobiles 103.

DSCH is the name given to the channel between the wireless network control device 101 and the base stations 102; this DSCH is mapped onto a PDSCH (physical downlink shared channel), which is one of the physical channels on wireless.

Also, for a single mobile 103, there is a single individually assigned channel, which is called a dedicated channel (DCH) between the wireless network control device 101 and a base station 102, and which is called a dedicated physical channel (DPCH) on wireless. The mapping of the channels is defined in 3GPP TS 25.301.

As shown in FIG. 1A, when data is transmitted on a DSCH, it is necessary to transmit control data, called signaling, on the DPCH. The signaling data is used to report to the mobile 103 whether or not data is present on the PDSCH, at a timing corresponding to this signaling.

Specifically, the mobile 103 is not always in receiving condition in regard to the PDSCH but only receives data on the PDSCH if signaling data has been received on the DPCH.

The ability to receive data on the DSCH therefore only exists in the case where a dedicated CH is set up in respect of the mobile 103; data cannot be received on the DSCH in the idle state or in a condition in which a dedicated channel is not set up. It should be noted that the mobile 103 is normally able to receive signaling data on the DPCH.

Mapping of the aforesaid signaling data wirelessly onto DPCH is as described above. Two methods are laid down between the wireless network control device 101 and base station 102. In one case, data is transmitted on DCH. In the other case, data is transmitted on another channel established for the signaling.

Thereupon, after the mobile 103 has received the signaling data, in order to start preparation for receiving the DSCH, the DSCH data must be transmitted later than the signaling by a delay time $\Delta T$.

The DSCH data is transmitted in accordance with a standard timing that is set for each sector, so the reception timings thereof are the same for the mobiles 103. In contrast, the DPCH reception timings are different for each of the mobiles 103. Consequently, the aforesaid delay time $\Delta T$ also differs for each mobile 103. The wireless network control device 101 must therefore perform transmission timing control of the signaling data, in consideration the delay time $\Delta T$ for each mobile 103.

It should be noted that the delay time $\Delta T$ is respectively reported to the wireless network control device 101, base station 102 and mobile 103 by the application at the time point of call set-up.

Also, as shown in FIG. 1B, the identifier ID 104-2 that is applied to each mobile is stored in the DSCH frame 104 in addition to the user data 104-1. This is necessary in order that the DSCH frame 104 should be correctly transmitted to a specified mobile 103.

For this reason, as shown in FIG. 1C, transmission can only be effected in respect of a single mobile 103 in a single transmission slot; a DSCH frame that is transmitted in this transmission slot cannot be simultaneously received by a plurality of mobiles 103.

FIG. 2 shows an example of the processing sequence in DSCH transmission. When the wireless network control device 101 receives (step S1) user data 104-1 from the core network 100, it generates a DSCH frame 104 (processing step P1) from the information that was already set as the user data 104-1. After this, the transmission timing of the DSCH frame 104 is determined (processing step P2).

Then, after the signaling data has been generated (processing step P3), the transmission timing of the signaling data is determined (processing step P4) using the aforesaid delay time $\Delta T$, from the DSCH frame transmission timing. The signaling data is transmitted (step S2) to the mobile 103 through the base station 102 in accordance with the signaling transmission timing.

When a mobile 103 receives signaling data, it becomes aware of the existence of a DSCH frame that is to be received on the PDSCH, and starts preparation to receive this DSCH frame (processing step P5). After this, the wireless network control device 101 transmits the DSCH frame to the mobile 103 (step S3) through the base station 102 in accordance with the DSCH frame transmission timing.

After receiving this DSCH frame, the mobile 103 compares the mobile identifier ID 104-2 in the data with its own ID (processing step P6) and, if they agree, performs subsequent data processing. Also, if the mobile ID 104-2 in the DSCH frame data does not agree with its own ID, it discards this DSCH frame (processing step P7).

DISCLOSURE OF THE INVENTION

As described above, since a single DSCH channel is shared by a large number of mobiles 103, high-speed/high efficiency wireless communication can be achieved. However, as shown in FIG. 1, transmission can only be effected in respect of a single mobile 103 in a single transmission slot. Thus, the DSCH frame that is transmitted in the transmission slot (see FIG. 1C) cannot be simultaneously received by a plurality of mobiles 103.

In the future, with improvements in transmission rate, it is planned to perfect a large-capacity service providing music delivery and video delivery, but when DSCH is employed in the current technology, when distributing the same data to a plurality of mobiles 103 in this way, because of the restrictions described above, it is necessary to transmit exactly the same data to as many mobiles as are to receive it. There is therefore considerable waste from the point of view of efficiency of use of wireless and wired transmission channels and it is thought that, as a result of the accumulation of the amount of data destined for the mobiles, the DSCH rate will be adversely affected and communication quality will tend to be lowered.

Although this problem may apparently be solved by fortifying the infrastructure, this results in increased costs of the infrastructure and so in increased communication charges and cannot but put a brake on future diversification and development of service modes.

An object of the present invention is therefore to provide an efficient communication method and device based on the current DSCH technique, whereby diverse services, in particular distribution system services (multi-cast services) can be implemented in future by improving the communication rate.

Furthermore, from the point of view of development costs and development time, it is important to take great pains not to alter the existing 3GPP regulations. Also, DSCH has the characteristic feature that reception is only possible when a dedicated CH has been setup in respect of a mobile. In view of this aspect, an object of the present invention is to provide a communication method and device aimed at implementing further new services wherein for example data distribution is performed on DSCH only during telephone service.

A characteristic feature of a communication method and device according to the present invention capable of meeting this object and comprising a wireless network control device, base stations and mobiles on which there is respectively installed one or more communication protocol as specified by for example 3GPP is the performance of multicast communication of data in respect of one or more mobiles using DSCH.

In addition, said wireless network control device according to the present invention is characterized by the provision of a functional section that processes DSCH internally and, in addition, the provision of table means that stores various types of setting information relating to DSCH communication and DSCH multi-cast communication. Using these items of information, multi-cast communication (including unicast communication) is implemented using DSCH in respect of one or more mobiles.

Also, a base station in accordance with the present invention comprises a function of transmitting DSCH data and/or said signaling data received from the wireless network control device to the mobiles through a wireless circuit.

Furthermore, in addition to the ordinary functions, a mobile may comprise an identification function in respect of whether data on the DSCH is unicast or multicast.

Further features of the present invention will become clear from embodiments of the present invention that are described below with reference to the drawings.

BRIEF DESCRIPTION OF THE DRAWINGS

FIG. 3 is a view given in explanation of an outline of a multicast DSCH communication method according to the present invention.

FIG. 5 is a view showing an embodiment of a wireless network control device 303 according to the present invention.

FIG. 6 is a view showing a practical example of a multicast setting table 502.

FIG. 7 is a view showing a practical example of a DSCH setting table 503.

FIG. 8 is a view showing what sort of information is set in the multicast setting table 502.

FIG. 9 is a view showing what sort of information is set in the DSCH setting table 503.

FIG. 12 is a view showing a specific example of a method of signaling.

FIG. 15 is a view given in explanation of the operation when a control frame is received from a base station 304.

DESCRIPTION OF THE PREFERRED EMBODIMENTS

Figure 4:
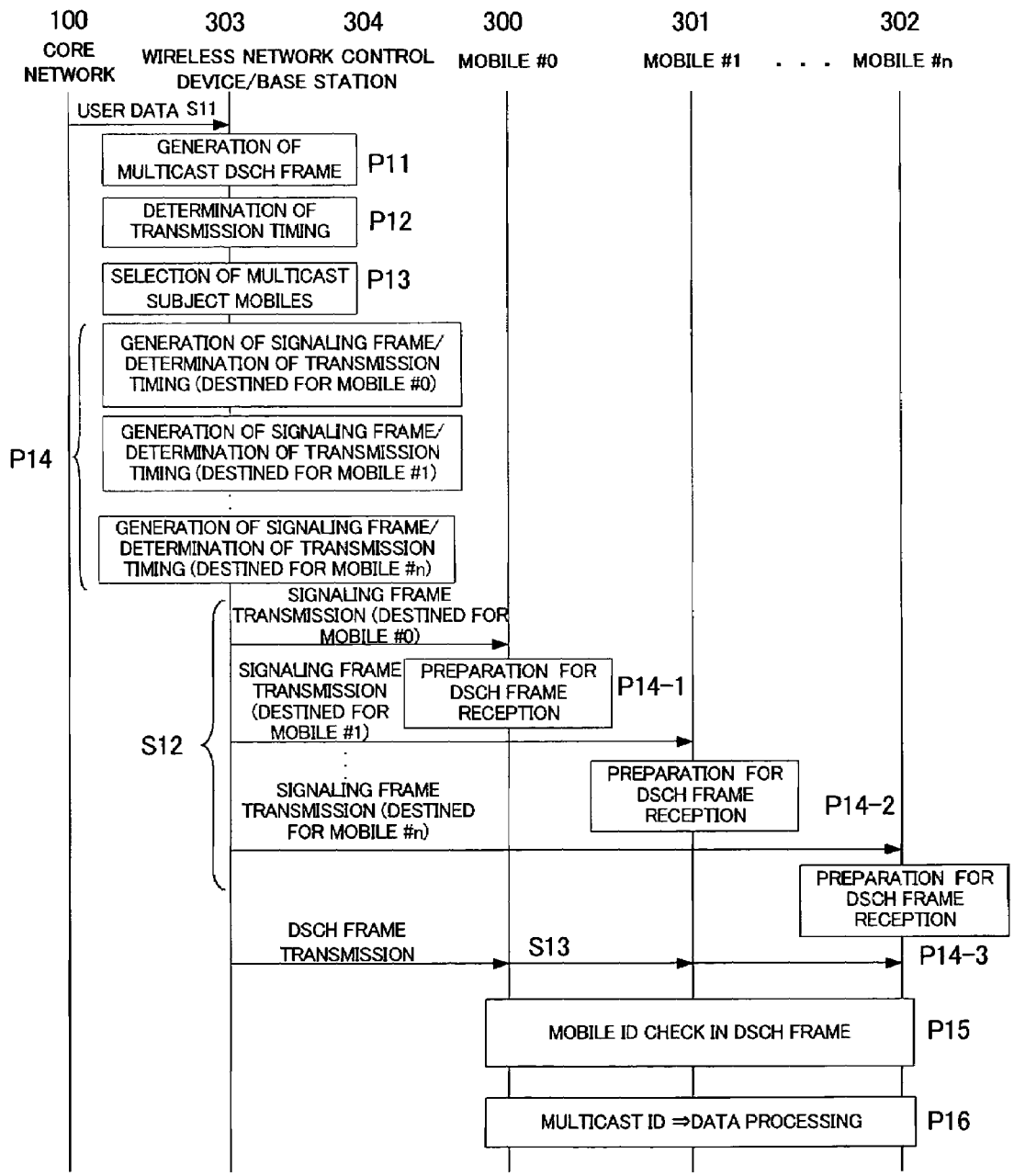
FIG. 4 is an operating sequence diagram of the method of multicast DSCH communication of FIG. 3.

FIG. 3 is a view given in explanation of an outline of a multicast DSCH communication method according to the present invention. FIG. 4 is an operating sequence diagram of the multicast DSCH communication method according to FIG. 3.

Figure 1A:
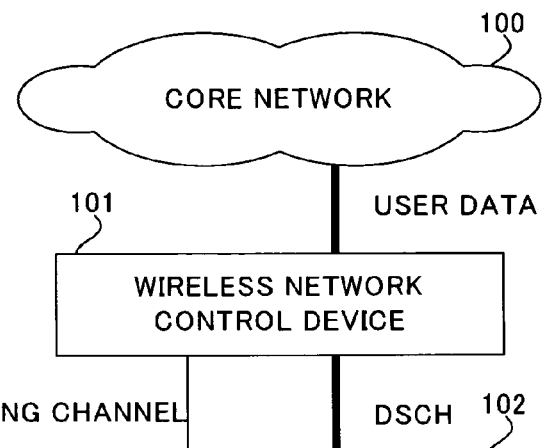
FIG. 1 is a view showing an outline of downlink data communication (communication to mobiles) in a communication system employing DSCH.
Figure 1B:
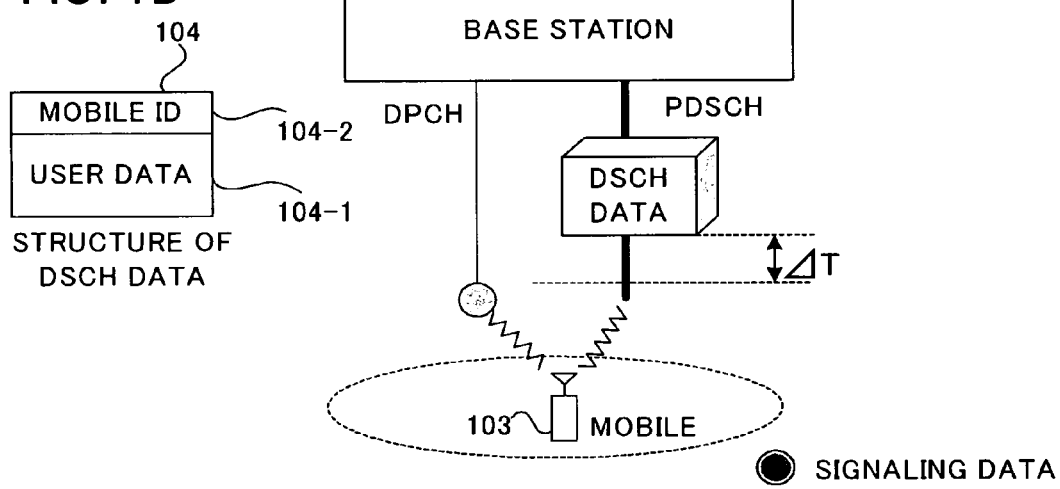
Figure 1C:
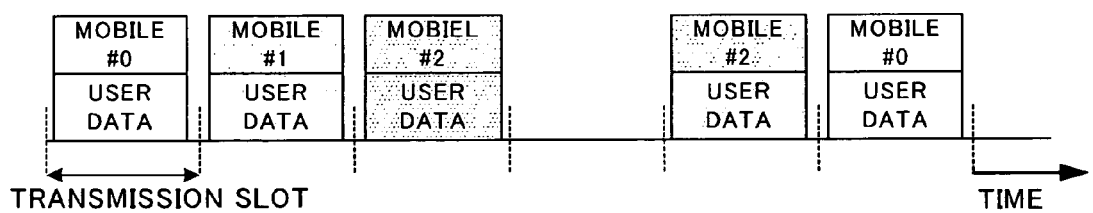

As described in FIG. 1, the reason why data can only be received by a single mobile for a single transmission slot is that a mobile ID is present in the DSCH frame.

Consequently, according to the present invention, as shown in FIG. 3B, identification information (multicast ID) for multicast is stored in the mobile ID storage area 306-2 of the DSCH frame 306 comprising the user data storage area 306-1 and mobile identifier ID storage area 306-2.

In this way, it is possible to arrange that a single DSCH frame 306 can be simultaneously received by a plurality of mobiles 300 to 302. FIG. 3A shows how a DSCH frame 306 using the aforesaid multicast ID is simultaneously received after reception of signaling data on their respective DPCHs by a plurality of mobiles 300 to 302.

Figure 2:
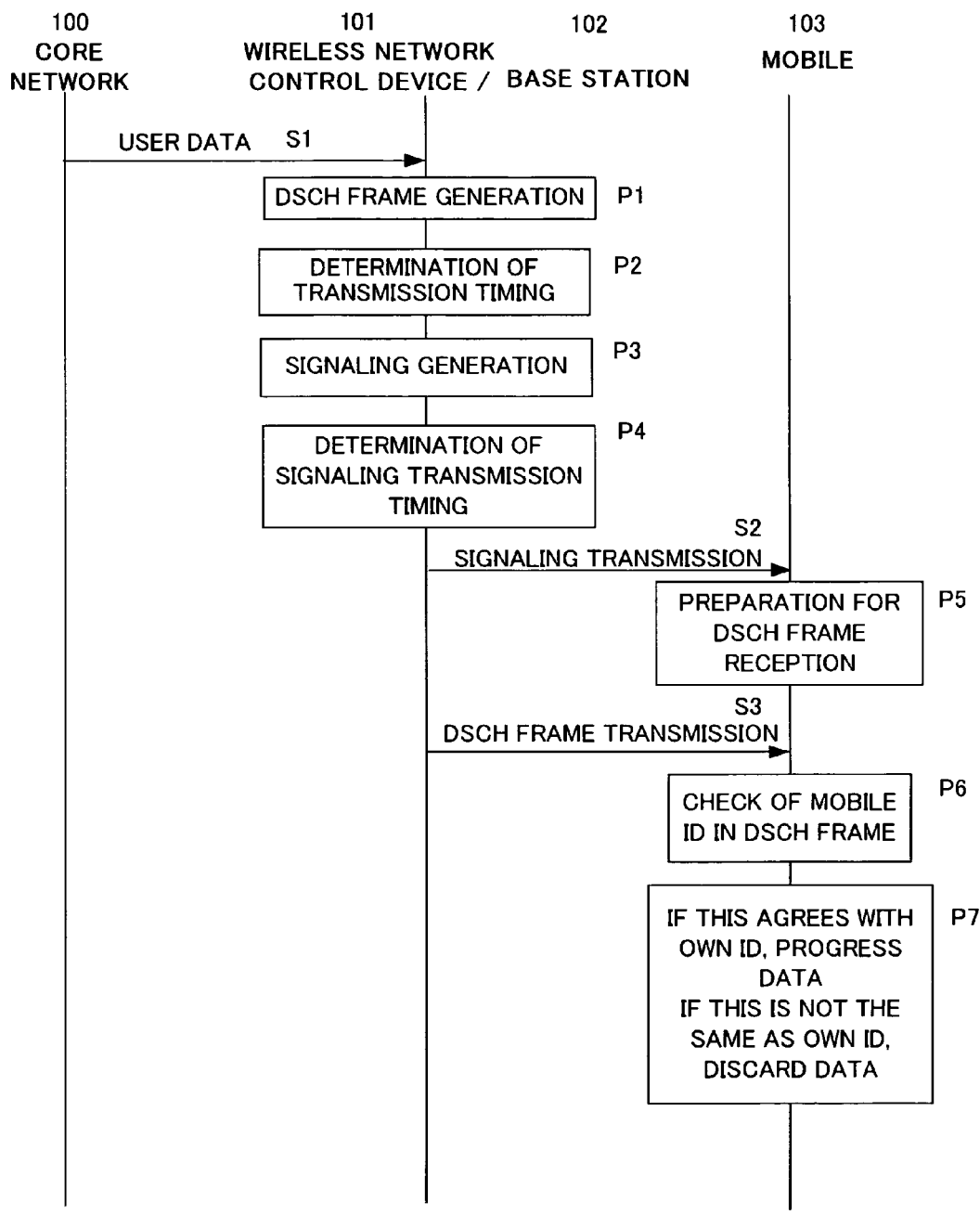
FIG. 2 is a view showing an example of a processing sequence during DSCH transmission.

The sequence during multicast communication using the DSCH described in FIG. 3 will be further described using FIG. 4. When the wireless network control device 303 receives user data from the core network 100 (not shown in FIG. 3) (step S11), it determines whether this user data is to be multicast or not; if this data is not to be multicast, it performs unicast processing in accordance with the sequence described in FIG. 2.

If the user data received from the core network 100 is to be multicast, the wireless network control device 303 generates the DSCH frame 306 of FIG. 3B (processing step P11) from the information that was already set as the user data in question.

After this, the transmission timing of the DSCH frame 306 is determined (processing step P12). At this point, the multicast ID is stored in the multicast ID storage region 306-2 described in FIG. 3 in the DSCH frame 306.

Next, based on the information relating to multicasting that is set therein, the wireless network control device 303 selects mobiles 300 to 302 in respective of which multicasting is to be performed (processing step P13) and determines (processing step P14) the transmission timing of the signaling frame and the generation of the signaling data for each mobile that is the subject of this multicasting.

The respective signaling data are transmitted (step S12) to all the mobiles 300 to 302 that are the subject of multicasting through the base stations 304, with the aforesaid signaling transmission timing. When the mobiles receive this signaling, they recognize the presence of the DSCH frame that is to be received on PDSCH and commence preparations for reception of this DCSH frame (processing steps P14-1 to P14-3).

After this, the wireless network control device 303 transmits the DSCH frame through the base stations of 304 to the mobiles 300 to 302 with the DSCH frame transmission timing (step S13).

After the mobiles have all received the DSCH frame 306 transmitted as described above, they check the mobile identifier ID in the respectively received data (processing step P15) and, if the identifier ID agrees with the multicast ID, continue processing of this received data (processing step P16). If the ID is not a multicast ID, in the processing step P6 in the sequence of FIG. 2, the mobiles compare the ID with their own IDs, respectively and, if they agree, perform the subsequent data processing. Also, if the ID in the received data and their own ID do not agree, they discard the DSCH frame 306 (processing step P7).

An embodiment of a wireless network control device 303 that executes this processing in a sequence in accordance with the present invention as described above will now be described.

FIG. 5 shows an embodiment of a wireless network control device 303 according to the present invention.

The wireless network control device 303 comprises a DSCH processing section 500, macro diversity processing section 505, main control section 507 and circuit terminating section 506; the respective functional sections are connected by an internal bus 501.

The macro diversity processing section 505 is a functional section for implementing macro diversity, which is a characteristic technique in mobile communication. In macro diversity, a plurality of channels are set up between a given node and a given mobile and identical data are copied and transmitted to all of the plurality of channels by the transmitting end. This is employed because communication quality such as during handover is improved by selecting at the receiving end the data of highest quality, of the identical data received on the plurality of channels.

Specifically, the macro diversity processing section 505 chiefly performs the following two processes.

(1) The data destined for a given mobile received from the core network 100 is copied to as many channels as are set up on the mobile in question, and transmission is performed to the mobile on all these set channels.

(2) The respective qualities of the data received on the plurality of channels from a given mobile are evaluated and the data that afford the best quality are selected and transmitted to the core network 100.

The circuit terminating section 506 has the function of terminating all circuits such as on the side of the core network 100 or on the side of the base stations 304 and of using the channel to transmit data to a processing block in a suitable device or another node.

Apart from setting the information of the various functional blocks within the device, the main control section 507 has the function of exchanging control information with other nodes.

The DSCH processing section 500 comprises a DSCH frame processing section 504 that performs therein DSCH frame generation and transmission timing adjustment etc, a multicast setting table 502 that stores information relating to multicasting using DSCH, and a DSCH setting table 503 that stores information for ordinary DSCH communication.

The control information received from the main control section 507 etc is set and stored in the multicast setting table 502 and/or the DSCH setting table 503. This information that has thus been set and stored is referenced during for example frame generation processing or transmission timing determination by the DSCH frame processing section 504.

It should be noted that, although, in the embodiment of FIG. 5, the DSCH processing section 500 and the macro diversity processing section 505 were constituted as separate functional blocks, this DSCH processing section 500 and macro diversity processing section 505 could be substantially constituted by a single functional block.

FIG. 6 shows a practical example of a multicast setting table 502. The layout of the multicast setting table 502 is that a single row shows the setting information of a single multicast group; this setting information comprises (a) a multicast channel identifier ID, (b) a DSCH identifier ID, (c) the number of mobiles participating in this multicast group and (d) the identifier IDs of these mobiles.

The details of these respective items of setting information are described below.

(a) "Multicast Channel Identifier ID"

This is the identifier of the multicast data distribution channel that is set up between the wireless network control device 303 and the core network 100. Although, in this case, it was assumed that a single multicast channel was always mapped onto a single DSCH, depending on the layout of the table, it would be possible to map a single multicast channel onto a plurality of DSCHs.

(b) "DSCH Identifier ID"

This is the identifier that is applied to a DSCH. In this case also, it is assumed that a single multicast channel is mapped onto a single DSCH, but, depending on the layout of the table, it would be possible to map a plurality of multicast channels onto a single DSCH.

(c) "Number of Mobiles"

This indicates the number of mobiles participating in a multicast group in the DSCH indicated by the DSCH identifier ID.

(d) "Mobile Identifier IDs"

This is a list, having the same number of entries as the number of mobiles, of the IDs that distinguish the mobiles that participate in the multicast group.

FIG. 7 shows a practical example of the DSCH setting table 503. One row of the layout of the DSCH setting table 503 indicates the setting information relating to a single DSCH; this setting information comprises: (a) the identifier ID of the dedicated channel, (b) a DSCH identifier ID, (c) the identifier IDs of the mobiles corresponding to the identifier ID of the dedicated channel, and (d) the timing offsets in the signal transmission that is set up in respect of the mobiles.

The details of the respective items of setting information are described below.

(a) "Identifier ID of the Dedicated Channel"

This is the identifier of the channel that is uniquely allocated to the respective mobiles and that is set up between the wireless network control device 303 and the core network 100. A single dedicated channel is always mapped onto a single DSCH.

(b) "DSCH Identifier ID"

This is the identifier that is applied to the DSCH. A single dedicated channel is mapped to a single DSCH.

(c) "Mobile Identifier IDs"

These are the identifier IDs of the mobiles to which the dedicated channel is allocated.

(d) "Timing Offset"

This expresses the amount of offset from the reference timing in the wireless network control device; transmission is effected to the mobiles with a timing that is adjusted by the amount of this offset from this reference timing.

Figure 10:
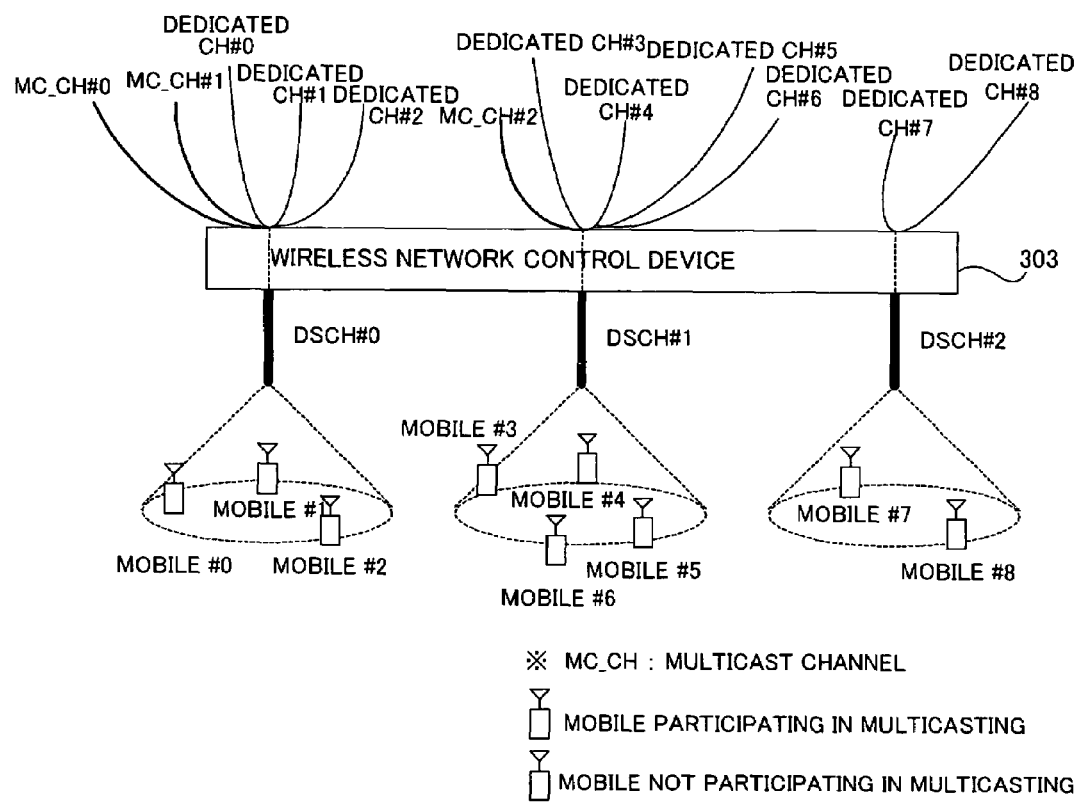
FIG. 10 is a view showing the correspondence of system state with a specific example.

FIG. 8 and FIG. 9 are views indicating what information is set in the multicast setting table 502 and the DSCH setting table 503, respectively, corresponding to the specific example of system condition shown in FIG. 10.

FIG. 10 shows only the wireless network control device 304; the base stations 304 are not shown. In this specific example, three DSCHs, #0 to #2 are set up; the multicast channels MC_CH #0 and #1 and the dedicated channels CH #0 to #2 are accommodated on the DSCH #0; the multicast channel MC_CH #2 and the dedicated channels CH #3 to #6 are accommodated on the DSCH #1; and the dedicated channels CH #7 to #8 are accommodated on the DSCH #2.

Furthermore, the mobiles #0 to #2 perform communication through the DSCH #0, the mobiles #0 and #2 are mobiles participating in multicasting, while the mobile #1 is a mobile that does not participate in multicasting.

Also, the mobiles #3 to #5 perform communication through the DSCH #1 and, of these, the mobiles #3 to #5 are mobiles participating in multicasting while the mobile #6 is a mobile that does not participate in multicasting. Further, the mobiles #7, #8 perform communication through the DSCH #2, but these mobiles do not participate in multicasting.

In regard to the condition of FIG. 10, the multicast setting table 502 of FIG. 8 has registered therein (a) which multicast channels are (b) accommodated on which DSCH and (c) the number of multicast participant mobiles and (d) the identifier IDs of the participant mobiles.

In contrast, the DSCH setting table 503 of FIG. 9 has registered therein (a) of the dedicated channel IDs, (b) the subject DSCH identifier IDs that are accommodated therein, and (c) the corresponding mobile identifier IDs.

Figure 11:
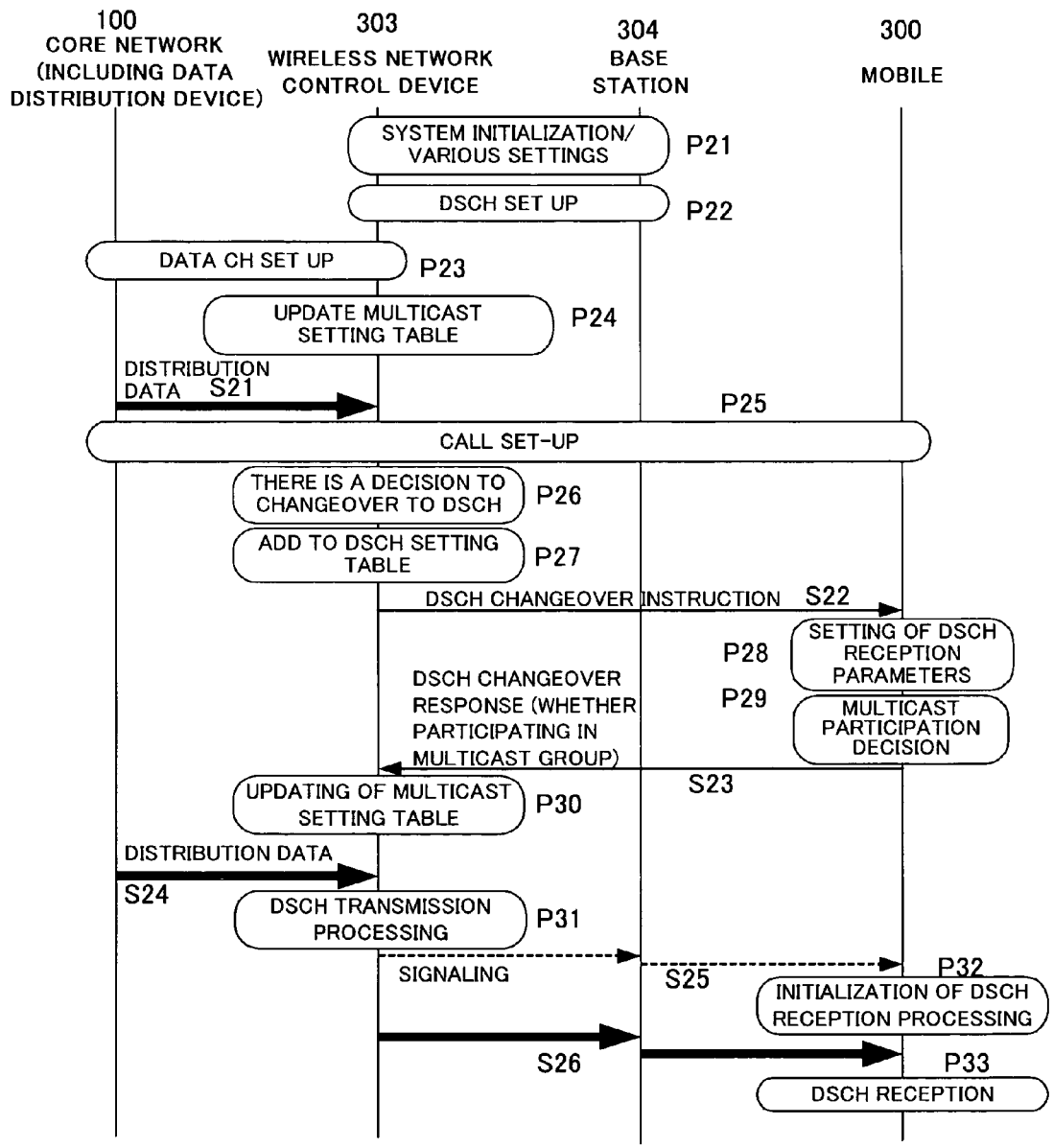
FIG. 11 is a view showing the processing sequence from start-up of the system up to commencement of multicast communication.

FIG. 11 is a view showing the processing sequence from start-up of the system up to commencement of multicast communication.

When the mobile network i.e. the wireless network control device 303 and the base stations 304 are started up, various settings are performed (processing step P21) in accordance with a predetermined procedure, between these nodes. At this point, setting of the DSCHs employed in the present invention is also performed (processing step P22).

When DSCH setting is completed, next, setting of the data channels for multicasting between the core network 100 and the wireless network control device 303 is performed (processing step P23). Although not shown in FIG. 11, it is assumed that the data channel for multicasting is connected for example to a data distribution server within the core network 100 (processing step P24).

After set-up of the data channel for multicasting has been completed, the multicasting setting table 502 within the wireless network device is updated (processing step P24) in accordance with the mapping information of the data channels for multicasting that have been set up and the DSCHs.

After this, communication of the multicast data from for example the data distribution server is commenced (step S21). At this stage, there need not necessarily be any mobile that receives the multicast data. Alternatively, it is also possible to stop transmission of the multicast data and to issue the data transmission commencement request to the server at a time-point where the mobiles that are to receive the multicast data are registered.

After this, when call connection of a particular mobile is effected (processing step P25), and when, by a prescribed procedure, a changeover decision is made (processing step P26) to use DSCH, the wireless network control device adds this mobile to the DSCH setting table 503 (processing step P27).

After this, instructions to change over to the DSCH are transmitted to the mobile 300 in question via the base station 304 (step S22).

When the mobile 300 receives the instructions to change over to DSCH, it extracts and sets the parameters for DSCH reception that are contained in the changeover instruction signal (processing step P28).

In addition, a decision is made as to whether or not the mobile 300 in question is to participate in the multicast transmission to which DSCH is being applied (processing step P29) and the mobile 300 in question returns (step S23) to the wireless network control device through the base station a response message of completion of DSCH changeover, including the result of this decision.

Regarding this decision as to whether or not the mobile 300 is to participate in multicast communication, the methods may be considered of setting the result of this decision beforehand by the user in the mobile or of setting the result of this decision in the network.

When the wireless network control device 303 receives from the mobile 300 the DSCH changeover response, if this contains a request to participate in multicasting, it updates the multicast setting table 502 therein to add the mobile in question (processing step P30).

It should be noted that, if, as the method whereby it is decided whether or not the aforesaid mobile is to participate in multicast communication, the method is adopted of setting the result of this decision in the network, authentication processing may be performed in the network 100 in the event of reception of a DSCH changeover response from the mobile, if the mobile is to participate in the multicast communication, processing may be performed to add the mobile to the multicast setting table 502.

After the mobile has been added to the multicast setting table 502, data is distributed (step S24) from the server or the like. This distribution data is assembled into DSCH frames in the DSCH processing section 500 in the wireless network control device 303 and its transmission timing is determined (processing step P31). After this, signaling in respect of the added mobile (step S25) and transmission of the DSCH frame (step 26) are performed.

For its part, after the mobile has received the signaling that has been transmitted thereto by the wireless network control device 303, DSCH reception processing (processing step P32) is initiated. DSCH frame reception processing (processing step P33) is performed as described with reference to FIG. 2 (processing steps P6 and P7) and FIG. 4 (processing steps P15, P16).

FIG. 12 shows a specific example of a method of signaling. Signaling must be transmitted to each mobile, so channels for signaling transmission must be set up allocated in units of the number of mobiles.

In 3GPP, as the channels for signaling, two methods are laid down, namely, a method employing a DCH and a method of setting up a new channel (signaling bearer) for signaling. Referring to FIG. 12, a description will now be given as to how signaling is actually transmitted within the wireless network control device 303 in the above two cases.

As described above, since signaling is generated and transmitted when data is transmitted on the DSCH, the opportunity for signaling transmission is created by the DSCH processing section 500.

This will be described with reference to the following four cases.

[Case A]

The case A shown in FIG. 12A is a case in which signaling is transmitted with DCH. In accordance with the embodiment described in FIG. 5, the DCH is terminated by the macro diversity processing section 505, so in the event of signaling transmission the DSCH processing section 500 must output a signaling transmission instruction to the macro diversity processing section 505.

At this juncture, the macro diversity processing section 505 must be able to identify in respect of which mobile (DCH) signaling is being transmitted, so the DSCH processing section 500 must give instructions for signaling transmission to the macro diversity processing section 505 and hand over the identifier ID of the mobile that is the subject of this transmission. At this juncture, in order for the transmission instruction and mobile identifier ID to be exchanged between the DSCH processing section 500 and the macro diversity processing section 505, the method of FIG. 5 of employing an internal bus or the method of providing a dedicated control path for signal exchange may be considered.

The macro diversity processing section 505 generates signaling data from the signaling transmission instruction and mobile identifier ID received from the DSCH processing section 500 and transmits this signaling data on the corresponding DCH. Although not shown in FIG. 5, the macro diversity processing section 505 is internally provided with mapping table means of the mobile identifier ID and DCH.

[Case B]

Case B, shown in FIG. 12B, is also a case in which signaling is transmitted with DCH. Unlike the case of FIG. 12A, it has a characteristic feature in regard to the method whereby generation and transmission of the signaling data are performed by the DSCH processing section 500 and mapping of the signaling data onto the DCH is performed by the circuit terminating section 506.

The DSCH processing section 500 performs transmission of signaling data to the circuit terminating section 506 using the same channel ID as the channel of the DCH where the macro diversity processing section 505 terminates. The channel ID whereby signaling transmission was performed by the DSCH processing section 500 is the same as the ID of the DCH corresponding to the mobile that is to receive the signaling, so the signaling data is merged with the DCH in the circuit terminating section 506 before being transmitted to the corresponding mobile through the base station 304.

It should be noted that, in this case, the DSCH processing section 500 must simultaneously identify the channel ID of the DCH corresponding to the mobile that is registered. This can be achieved by storing as additional information in the DSCH setting table 503 shown in FIG. 7.

[Case C]

In case C shown in FIG. 12C, a channel for signaling (signaling bearer) is newly set up between the DSCH processing section 500 and base station 304. This is an example in which signaling data is transmitted using this channel. In this case, the signaling data that is generated in the DSCH processing section 500 is transmitted by the signaling bearer at which the DSCH processing section 500 terminates, without modification.

[Case D]

In the case D shown in FIG. 12D, a channel for signaling (signaling bearer) is newly set up between the macro diversity processing section 505 and the base station 304; this is an example of the case where signaling data is transmitted using this channel. This case also is the same as case A.

Figure 13:
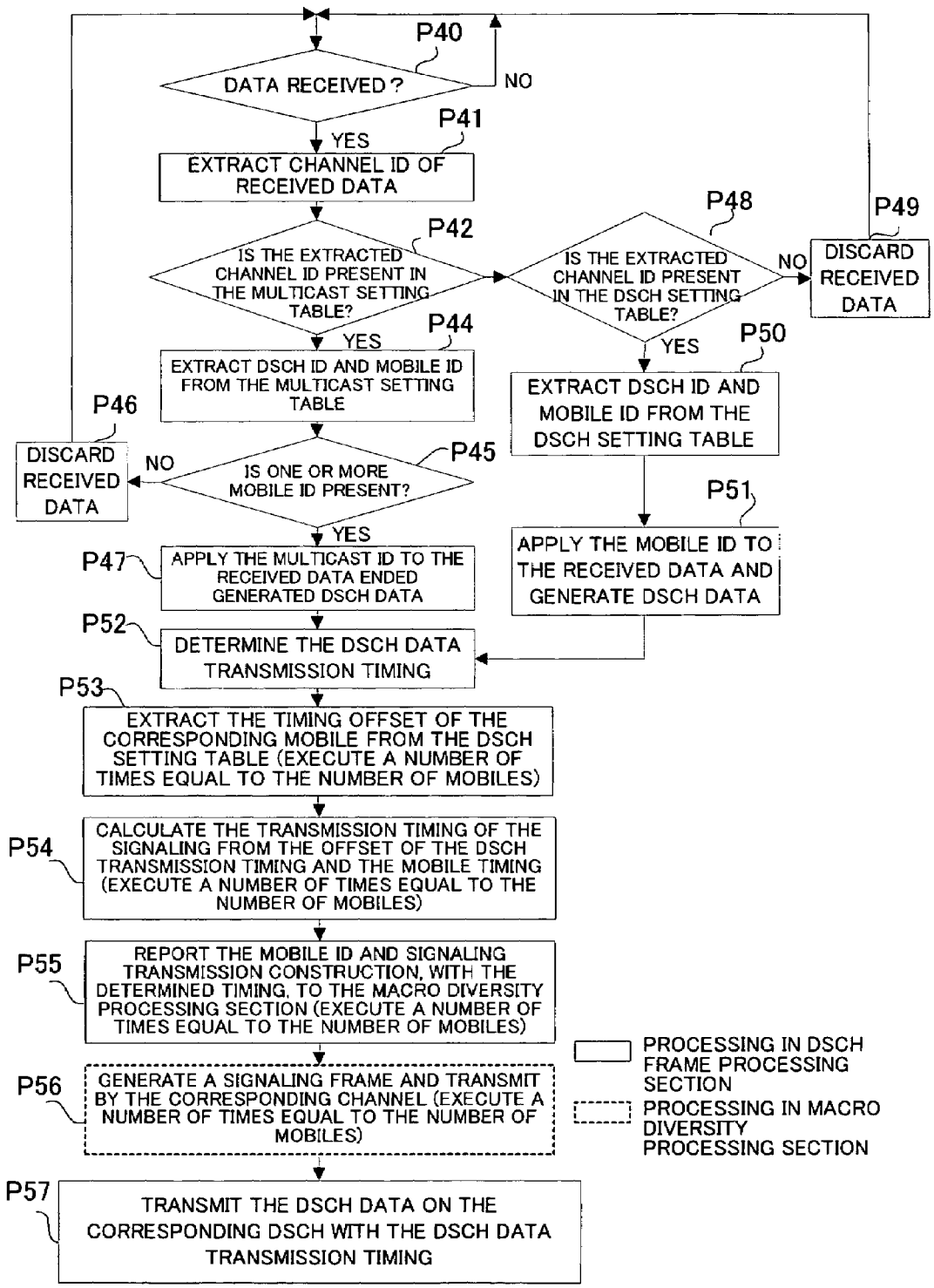
FIG. 13 is a view showing the processing flow during DSCH transmission in a wireless network control device 303, in particular a DSCH processing section 500 and macro diversity processing section 505.

FIG. 13 is a view showing the processing flow during DSCH transmission in the wireless network control device 303, in particular in the DSCH processing section 500 and the macro diversity processing section 505. In this case, case A of FIG. 12A is employed as the signaling method.

When the DSCH processing section 500 receives data from the core network 100 (processing step P40, Yes), the channel ID of the received data is extracted (processing step P41). The DSCH processing section 500 checks for the existence of the channel ID extracted in the processing step P41 in the multicast setting table 502 (processing step P42) by referencing this multicast setting table 502.

If the channel ID extracted in the processing step P41 is present in the multicast setting table 502 (processing step P42, Yes), the DSCH processing section 500 extracts the DSCH-ID and all of the mobile IDs belonging to the DSCH from the multicast setting table 502 (processing step P44).

Next, if not even one mobile ID is present in the multicast setting table 502 (processing step P45, No), nor in the DSCH setting table 503 (processing step P43, No), the data is discarded (processing step P46).

If one or more mobile ID is present in the multicast setting table 502 (processing step P45, Yes) the DSCH processing section 500 applies the data received in processing step P1 to the multicast ID to generate the DSCH frame (processing step P47).

On the other hand, if, in processing step P42, the channel ID extracted in processing step P41 is not present in the multicast setting table 502 (processing step P42, No), the DSCH processing section 500 checks to ascertain whether or not the extracted channel ID is present in the DSCH setting table 503 (processing step P48).

If, in processing step P48, the extracted channel ID is not present in the DSCH setting table 503, the DSCH processing section 500 discards the data received in the processing step P40 (processing step P49).

If, in the processing step P49, the extracted channel ID is present in the DSCH setting table 503 (processing step P48, Yes), the DSCH processing section 500 extracts the DSCH- ID and mobile ID from the DSCH setting table 503 (processing step P50). After this, the extracted mobile ID is applied to the data received in the processing step P1 and the DSCH frame is generated (processing step P51).

Next, after the DSCH frame has been generated in the processing steps P47, P51, the DSCH processing section 500 determines the transmission timing of the DSCH frame that has been generated (processing step P52) and acquires the timing offset of the mobile corresponding to this DSCH from the DSCH setting table 503 (processing step P53).

In this way, the signaling data transmission timing is calculated (processing step P54) from the DSCH frame transmission timing and the timing offset of the mobile.

After this the DSCH processing section 500 reports the mobile ID and the signaling transmission instruction to the macro diversity processing section 505 (processing step P55) in accordance with the signaling timing determined in processing step P54.

The macro diversity processing section 505 generates a signaling frame using the mobile ID and the signaling transmission instruction that are handed over from the DSCH processing section 500, and transmits this signaling frame on the corresponding DCH (processing step P56).

The processing of the aforesaid steps P52 to P56 is executed a number of times equal to the number of mobiles. After this, the DSCH processing section 500 transmits (processing step P57) the DSCH frame generated in the processing step P47 or in the processing step P51 on the DSCH in accordance with the DSCH frame transmission timing that was determined in the processing step P52.

Figure 14:
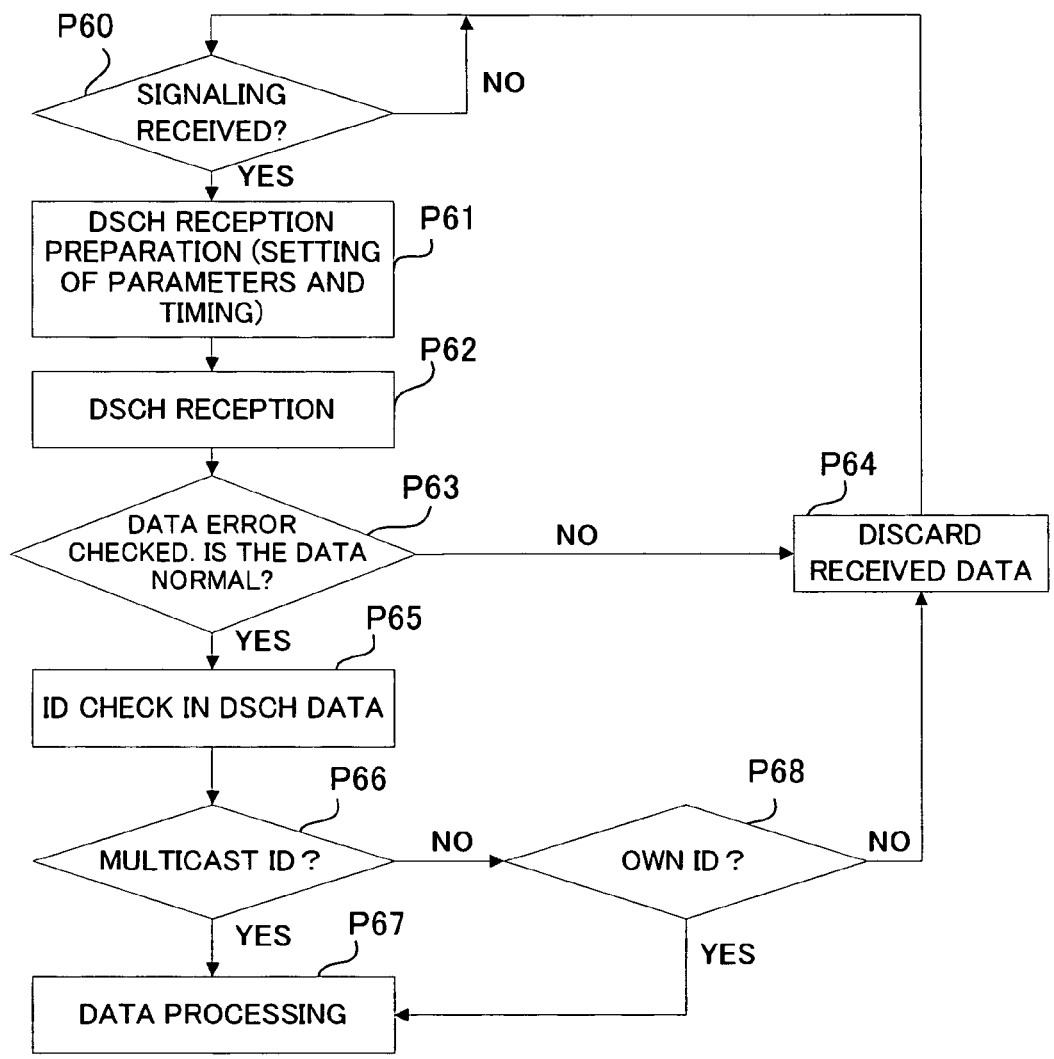
FIG. 14 is a view showing the processing flow during DSCH reception in a mobile.

FIG. 14 is a view showing the processing flow during DSCH reception by a mobile. In FIG. 14, it is assumed that the dedicated channels (DCH, DPCH) are already set up by a prescribed procedure at the mobile.

When the mobile receives signaling on the DPCH (processing step P60, Yes)), the DSCH reception preparation is commenced (processing step P61) and the DSCH frame on the PDSCH is received (processing step P62).

After this, an error check of the DSCH frame is performed (processing step P63). If any abnormality in the data is found, the received DSCH frame is discarded (processing step P64).

If the received DSCH frame is normal (processing step P63, Yes), the identifier ID in the DSCH frame is checked (processing step P65) and if this identifier ID is a multicast ID (processing step P66, Yes), data processing as multicast data is performed (processing step P67).

On the other hand, if, in processing step P66, it is found that the identifier ID is not a multicast ID, the identifier ID in the DSCH frame is compared with the mobile's own identifier ID (processing step P68) and if it is not found to agree with the mobile's own identifier ID (processing step P68, No), the received DSCH frame is discarded (processing step P64).

If the identifier ID agrees with the mobile's own identifier ID (processing step P68, Yes), ordinary unicast processing is performed (processing step P67).

FIG. 15 describes the operation when a control frame is received from the base station 304. In 3GPP, various control frames are defined between the wireless network control device 303 and base station 304. One of these is a control frame called the timing adjustment control frame. This is employed to adjust the channel timing that is set between the wireless network control device and the base station.

The timing adjustment control frame is used to store and transmit the difference with respect to the appropriate reception timing from the base station 304 to the wireless network control device 303, in cases where the data that was transmitted by the wireless network 100 is not received with the appropriate timing at the base station 304. Also, the timing adjustment control frame is returned using a channel where the transmission timing is abnormal.

When the wireless network control device 303 receives a timing adjustment control frame, it adjusts the transmission timing within the wireless network control device 303 by the amount of the timing to be adjusted that is stored in the frame relating to the received channel and subsequently performs data transmission with this timing.

The details of timing adjustment are set out in 3GPP TS25.402.

In a data communication system using DSCH, the signaling data is transmitted to the mobile immediately prior to transmission of the DSCH frame, but, as mentioned above, the transmission timing of the signaling data is based on the transmission timing of the dedicated channel (DCH, DPCH).

Consequently, if any abnormality were to be generated in the transmission timing in the dedicated channel during transmission on the ordinary dedicated channel, in regard to this dedicated channel, in the event of an incoming transmission of this timing adjustment control frame it would not only be necessary to adjust the transmission timing of this dedicated channel, but it would also be necessary to adjust the timing offset of each mobile stored in the DSCH setting table 503 in the DSCH processing section 500.

Accordingly, as described above, when a timing adjustment control frame is generated on a dedicated channel, the method is specified of reporting the control information (in this case, the timing adjustment value) also to the DSCH processing section 500. It should be noted that the following method can likewise be applied to other control frames associated with the dedicated channel.

FIG. 15A to FIG. 15C show three patterns, namely, case A, case B and case C as methods for reporting control information on reception of a timing adjustment control frame to the DSCH processing section 500. These three patterns will be described below.

[Case A]

In Case A shown in FIG. 15A, the timing adjustment control frame that is transmitted on the DCH is terminated by the macro diversity control section 505, and an adjustment value in respect of the DCH is extracted from the control frame.

The macro diversity processing section 505 performs timing adjustment of the DCH in question within its own processing section, using the aforesaid adjustment value. The macro diversity processing section 505 reports this adjustment value and the mobile ID to the DSCH processing section 500. The DSCH processing section 500 is thereby able to adjust the timing offset amount corresponding to the mobile in question in the DSCH setting table 503, using the adjustment value and the mobile ID.

[Case B]

In case B shown in FIG. 15B, the circuit terminating section 506 copies all of the uplink data that is transmitted on the dedicated channel terminated by the macro diversity processing section 505 and transmits this also to the DSCH processing section 500.

The DSCH processing section 500 is arranged to monitor, all the time, the uplink data on the dedicated channels that are received by transmission from the circuit terminating section 506 so as to receive only control data such as timing adjustment frames and discard ordinary user data. In this way, the DSCH processing section 500 can also learn the timing adjustment amount on the dedicated channels.

[Case C]

In Case C shown in FIG. 15C, a number of control frame dedicated channels equal to the number of dedicated channels are set up between the wireless network control device 303 and the base stations 304 and control frames are transmitted to the wireless network control device 303 from the base stations 304 on the dedicated channels. In this process, respective copied control frames are transmitted on the dedicated channel in question and the control frame dedicated channel in question after copying the control frame within the base station 304.

Service employing multicast DSCH that is capable of being implemented by applying the present invention will now be described.

As described above, in order for the mobile to receive data on DSCH, it is essential to receive signaling data on a dedicated channel (DPCH).

This means that, in order to receive DSCH, the mobile must be in call-connected condition rather than in idle condition. Specifically, a characteristic feature of service using multicast DSCH is that a service can be provided that is distributed by multicasting to mobiles that are in connected condition.

Also, although description thereof has been omitted from the above, one or several DSCH channels are normally set up for each area unit and changeover of the DSCH that is being received is performed when a mobile moves from a given area to another area. In other words, this may be said to constitute a further characteristic feature of multicast communication using DSCH in that different information can be distributed for different areas.

Thus the characteristic features of a multicasting service using DSCH may be summarized as "an area-aware service available only to mobiles that are in a call-connected condition".

It should be noted that, since DSCH cannot be received by mobiles that are not in a call-connected condition, there is no wasted power consumption due to multicast distribution to mobiles that are in an idle condition.

Various examples of such services are described below.

Practical Example 1

Area Information Distribution Service Using Multicast DSCH

Information relating to this area is constantly distributed using multicast DSCH, for each area, from for example server means within the core network, and the mobile receives this area distribution information by performing call connection.

Practical Example 2

BGM Distribution Service Using Multicast DSCH

For example music data is constantly transmitted from for example server means in the core network and this is multicast within the area using DSCH. When a mobile comes into service by performing call connection, this distributed music data is received on the DSCH and reproduced. In this way, it is possible to hear as BGM this music that is received in the background, while carrying on a conversation with another party.

Furthermore, it may be envisioned that a service may be provided displaying characteristic features for each geographical region by using different music data for each area. This is of course not restricted to music data and a similar service could be provided for all types of audible data.

INDUSTRIAL APPLICABILITY

There has been an enormous increase in communication rates and communication quality in recent years due to advances in mobile communication technology. As a result, service modes have been diversified and services are being commenced that handle large quantities of data in the form not merely of voice telephone service but also of images or video. Currently however, most services are user request type services and high rate broadcast/multicast type services such as radio or television are considered merely as future possibilities.

Viewed from this aspect, as mentioned above, the current third-generation mobile communication technology, in particular, W-CDMA communication networks as specified by 3GPP, are not considered to provide an optimum method for realizing high rate multicast services in an efficient manner at the present time. This must have the effect of impeding the development of communications services which might be expected to offer high diversity in the future.

With the present invention, efficient multicast services can be implemented simply by revising somewhat the DSCH technology in 3GPP. Also, by exploitation of the highly characteristic technical feature that "a distributed service allocated in area units can only be received during call connection", it is envisioned that various different types of services, which were hitherto difficult to implement, may be expected to become further developed, leading to expansion of the mobile communication market.

Furthermore, it is envisioned that such diversification and expansion of services will make it possible to change over from a situation in which communication enterprises obtain profit by communication charges from users towards a situation in which communication network charges are obtained from multicast service providers, thereby making it possible to reduce communication charges that are currently borne by users, and as a result make it possible to further expand the market.

The invention claimed is:

1. A mobile communication system comprising:
a wireless network control device connected to a network;
a base station;
one or more mobiles connected with said base station, wherein
data are transmitted from said wireless network control device to said one or more mobiles using a downlink shared channel, a channel for transmitting multicast data is set up between data server means present on said network and said wireless network control device, and said channel that is set up is mapped to said downlink shared channel; and
mapping table means for storing the correspondence relationship of said downlink shared channel and dedicated channels that are set up for each mobile between core network and said wireless network, in said wireless network control device, wherein said dedicated channels are mapped onto a suitable downlink shared channel by referencing said mapping table means, wherein said mapping table means stores the identifier of the mobile for each said dedicated channel and unicasts data in respect of the mobile indicated by said identifier, and wherein said mapping table means stores a timing offset for each said dedicated channel and, when transmitting data using said dedicated channel, transmits data to a corresponding mobile with a transmission timing based on said timing offset.

2. The mobile communication system according to claim 1, further comprising,
mapping table means for storing the correspondence relationship of one or more channels and said downlink shared channel in said wireless network control device, wherein
said channel for transmitting said multicast data is mapped to a suitable downlink shared channel by referencing said mapping table means.

3. The mobile communication system according to claim 2, wherein said mapping table means stores the identifiers of mobiles that are the subject of multicasting for each downlink shared channel and multicasting of data is performed in respect of mobiles that are indicated by said identifiers.

4. The mobile communication system according to claim 2, wherein
said mobile receives an instruction to change over to the downlink shared channel from said wireless network control device, and
said mobile stores information indicating whether or not it participates in multicasting in said response message when said mobile transmits a response message in respect of said changeover instruction to said wireless network control device.

5. The mobile communication system according to claim 4, wherein said wireless network control device references the information indicating whether or not said mobile participates in multicasting that is stored in the response message with respect to said changeover instruction and, if this information indicates "participates", registers the mobile that has transmitted said response message in said mapping table means.

6. The mobile communication system according to claim 2, wherein multicast data distribution is performed using said downlink shared channel only on mobiles that are in call-connected condition.

7. The mobile communication system according to claim 6, wherein the distribution content is made different for each area when multicast data distribution is performed using said downlink shared channel only on mobiles that are in connected condition.

8. The mobile communication system according to claim 1, wherein said wireless network control device, when multicasting data on said downlink shared channel, selects mobiles to be the subject of multicasting by referencing said mapping table means and transmits signaling data with a suitable timing to all of the selected mobiles.

9. The mobile communication system according to claim 8, wherein said wireless network control device stores identification information indicating that data is data that has been multicast within the data frame of said downlink shared channel that is transmitted, when performing multicasting of data using said downlink shared channel.

10. The mobile communication system according to claim 9, wherein said mobile determines whether or not the received data frame of the downlink shared channel has been multicast by referencing said identification information.

11. The mobile communication system according to claim 9, wherein said mobile performs ordinary unicast reception, if the identifier of said mobile is stored in the data frame of the downlink shared channel that is received by said mobile instead of a multicast identifier.

12. The mobile communication system according to claim 9, wherein said mobile discards said received data, if the identifier that is stored in a data frame of the downlink shared channel that is received by said mobile is neither a multicast identifier nor the identifier of said mobile.

13. The mobile communication system according to claim 1, wherein said timing offset information is updated when said wireless network control device receives control data prompting timing adjustment from said base station on a dedicated channel or a signaling data dedicated channel.

* * * * *